US008752806B2

(12) United States Patent
Schaible et al.

(10) Patent No.: US 8,752,806 B2
(45) Date of Patent: Jun. 17, 2014

(54) FLUID-OPERATED ACTUATING DRIVE ON A VALVE

(75) Inventors: Jochen Schaible, Altensteig (DE); Marcus Groedl, Altdorf (DE); Stephan Schelp, Hohenfurch (DE); Norbert Eufinger, Limburg (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 0 days.

(21) Appl. No.: 13/566,604

(22) Filed: Aug. 3, 2012

(65) Prior Publication Data

US 2013/0015379 A1 Jan. 17, 2013

Related U.S. Application Data

(63) Continuation of application No. PCT/EP2011/000527, filed on Feb. 4, 2011.

(30) Foreign Application Priority Data

Feb. 5, 2010 (DE) ......................... 10 2010 007 137

(51) Int. Cl.
*F16K 31/122* (2006.01)

(52) U.S. Cl.
USPC ............................................... 251/58; 251/74

(58) Field of Classification Search
USPC ........... 251/14, 31, 58, 66, 68, 69, 74, 129.06
See application file for complete search history.

(56) References Cited

U.S. PATENT DOCUMENTS 1,780,471 A * 11/1930 Galloway et al. ................. 91/27
2,716,015 A * 8/1955 Allen ............................. 251/66
3,218,024 A * 11/1965 Werner ........................... 251/58
3,452,961 A * 7/1969 Forsman ......................... 251/31
3,887,160 A * 6/1975 Cusveller ........................ 251/31
4,986,301 A * 1/1991 Ziliani et al. ............. 137/315.35
5,810,326 A * 9/1998 Miller ............................. 251/58
6,659,119 B2 * 12/2003 Taylor ............................ 137/70
7,913,971 B2 * 3/2011 Hoang ............................ 251/14
2006/0243935 A1 * 11/2006 Hoch et al. ...................... 251/58
2010/0180954 A1 * 7/2010 Hagler ............................ 137/14

FOREIGN PATENT DOCUMENTS

DE 9406760 8/1994
EP 0665373 5/2000
EP 1418343 5/2004
EP 1593893 10/2007
EP 2101061 9/2009

OTHER PUBLICATIONS

English Translation of International Search Report for corresponding International Application No. PCT/2011/000527 with mail date of May 20, 2011.

* cited by examiner

*Primary Examiner* — John K Fristoe, Jr.
*Assistant Examiner* — Daphne M Barry
(74) *Attorney, Agent, or Firm* — Myers Wolin, LLC

(57) ABSTRACT

A fluid-operated actuating drive (1) on a valve, in particular a shut-off, safety or regulating valve, comprising a base unit (2) having control valves, two linear actuators (6, 7) which are located opposite of each other and can be actuated fluidically, and a mechanical converter (5) which is arranged between the two linear actuators and couples the gates thereof to each other, wherein the outlet of the converter is coupled to the inlet of the valve. To this end, the actuating drive is composed in a modular manner of individual components joined to form a functional unit in the form of the base unit, the two linear actuators and the mechanical converter.

16 Claims, 9 Drawing Sheets

FLUID-OPERATED ACTUATING DRIVE ON A VALVE

CROSS REFERENCE TO REALTED APPLICATIONS

The present application is a continuation of International Application No. PCT/EP2011/000527 filed on Feb. 4, 2011, which claims priority to DE 10 2010 007 137.4 filed on Feb. 5, 2010, the contents of each of which are incorporated herein by reference.

FIELD OF THE INVENTION

The present invention relates to a fluid-operated actuating drive on a valve, especially a shutoff, safety or regulating valve.

BACKGROUND

In practice, various valve actuating drives are known and in use. Besides widely employed electrical valve actuating drives, these also include in particular fluid-operated valve actuating drives (see, for example, EP 0665373 B1, EP 1418343 B1, EP 1593893 B1 and EP 2101061 A1). Such fluid-operated valve actuating drives may then comprise in particular, besides a hydraulically or pneumatically urged linear actuator, whose slide may be coupled directly or possibly via a mechanical converter with the input of the valve, a base unit provided with the control valves and/or other fluidic control means.

DE 9406760 U1 discloses a drive unit for valve, especially in shipbuilding. Therein there is provided a housing, which encloses an electric motor, a pump driven thereby, control elements and a hydraulic reservoir. The housing is connected to a swiveling drive, which comprises a piston with toothed rack and a shaft.

U.S. Pat. No. 4,647,003 A discloses an actuating device for the valve of a shutoff valve. The actuating device comprises a housing with a shaft mounted to rotate therein, capable of being coupled with the rotary shaft of the valve and having an associated pinion, with which the toothed rack meshes with at least one linear actuator constructed as a pneumatic cylinder. Depending on need, one or two pneumatic cylinders may be mounted on the housing. To supply the actuating device with compressed air, corresponding ports, to which the associated lines may be connected, are provided on the housing and the cylinders of the linear actuators.

SUMMARY

The object of the present invention is to provide a fluid-operated valve actuating drive, which is characterized by particular practical utility, in that namely it inherently combines characteristics particularly relevant for a broad user community, such as high reliability and long useful life, low maintenance expense and high user convenience, high power density and low manufacturing and operating costs.

In this sense, the inventive fluid-operated valve actuating drive is characterized in particular by the fact that it comprises two linear actuators disposed opposite one another and one mechanical converter, which is disposed between them, which couples their slides with one another and the output of which is coupled with the inlet of the valve. This valve actuating drive is constructed modularly as a fluidic drive system comprising individual components in the form of the base unit, joined together as a functional unit, the two linear actuators and the mechanical converter. In particular, there is provided in this way a particularly compact and efficient fluidic drive system on a valve, which system may be constructed as a closed system provided with only one electrical input and one mechanical take-off means acting on the inlet of the valve, and in this way is maintenance and user friendly to a degree known heretofore only for electrical valve drives.

The joining together of the said components as the compact, closed fluidic drive system may be accomplished in particular by the fact that the two linear actuators are flanged onto the mechanical converter, which in turn is connected via a flanged joint to the base unit (or if necessary to an emergency actuation block connected in turn to the base unit). This ensures that—according to a further aspect essential for the present invention—all fluid connections between the base unit and the actuators and if necessary the mechanical converter are routed inside the components in question, so that no kind of exposed fluid lines exist. These said fluid connections may be equipped, specifically in the region of the separating planes through which they pass between the said components, with self-closing shutoffs, which prevent the emergence of fluid or the unintended penetration of contaminants along the separating planes, especially when individual components are demounted for the purpose of maintenance. Filter elements (for example in the form of filter pots) may be provided in the region of these shutoffs, especially integrated therein or respectively joined thereto as a structural unit. All technical viewpoints mentioned in the foregoing and structurally improving the inventive valve actuating drive prove to be particularly advantageous in hydraulic valve actuating drives according to the present invention. They act in particular to the effect that, from the viewpoint of the user of the fluid-operated valve actuating drive, they may be regarded as completely equivalent to the electrical valve actuating drives in terms of maintenance and upkeep, while at the same time preserving the specific advantages of fluid-operated versus electrical valve actuating drives, namely the high power density and particular compactness as well as reliability and simple implementation of highly dynamic safety functions if necessary, even for explosion protection, the latter feature in particular being due to the capability of storing fluidic energy.

Within the scope of the present invention, the pressurized-fluid supply is organized decentrally, in other words is allocated only to a respective individual valve actuating drive, by the fact that the base unit of the inventive fluid-operated valve actuating drive comprises a pressurized-fluid supply unit. In the case of a hydraulically operated valve actuating drive according to the present invention, such a pressurized-fluid supply unit particularly preferably comprises a hydraulic assembly fed from a tank and equipped with a pump driven by an electric motor. In contrast, in a pneumatically operated valve actuating drive according to the present invention, the said pressurized-fluid supply unit preferably comprises a pneumatic pump driven by an electric motor and aspirating ambient medium—preferably via a filter system. If the inventive fluid-operated valve actuating drive is constructed in the foregoing sense as a hydraulic actuating drive, it may be provided, according to yet another preferred improvement, with a filling port suitable for the first filling of the fluid system with hydraulic fluid from a cartridge, especially a port disposed on the base unit. This enables the user to place a hydraulically operating valve actuating drive according to the present invention in service without coming into contact in any way with hydraulic fluid. This in turn favors the use of hydraulically operated valve actuating drives, which as regards their operating behavior are superior to electrical valve actuating drives (see hereinabove), even in applications in which special value is placed by the user on cleanness and a minimum risk of coming into contact with hydraulic fluid.

In application of the present invention, in contrast to what was possible heretofore with fluidic valve drives, the possibility now exists of a valve drive that is completely ready to operate, so that it can be placed in service without problems by the respective user or operator, specifically at low startup costs that heretofore were unattainable for fluidic valve actuating drives of comparable performance. In this respect the modular or building-block principle implemented in application of the present invention plays a considerable role, which permits the provision of individualized valve actuating drives specifically adapted to the respective requirement at extremely competitive costs, in which connection not only the converter and the two linear actuators may be individually varied in their dimensions but instead the possibility exists, as explained in more detail hereinafter, of combining functionally different linear actuators and mechanical converters with one another in any desired manner. Thus the said mechanical converter may convert the linear motion of the slides of the two linear actuators into a rotary motion, namely when the valve is provided with a turntable blocking element, whose position is variable by means of the valve actuating drive. In contrast, for a different application with the same linear actuators, a mechanical converter may be combined with a linear take-off means as a functional unit. Analogous possibilities exist for the two linear actuators. In particular, depending on the respective application, pneumatic or hydraulic linear actuators may be built in, in which case different embodiments may again be employed within the two groups, such as, in the pneumatic functioning principle, for example, traditional pneumatic actuators, spring actuators with control-air filling, spring actuators with pneumatic preloading or fluid accumulators.

An electrofluidic signal transducer, which in particular is disposed upstream from the base unit and may have a proportional output response, may cooperate with the fluidic control system typically provided in valve actuating drives of the type in question here. Furthermore, an external electrical regulating unit, which may comprise input means, a setpoint input, a regulating electronic unit, a communication unit, a signal output and/or a signal generator, may also be connected to a signal input in communication with the this electrofluidic signal transducer. In the sense of a closed regulation circuit, the actual-value signal of a measuring sensor associated with the valve may then be fed back to the electrical regulating unit.

According to a preferred improvement of the invention, it is provided that at least one of the two linear actuators, especially both linear actuators, is/are constructed as actuators urged by fluid on both sides, wherein both working chambers are constantly connected to a pressurized-fluid supply. This is of particular advantage in pneumatic systems. If both working chambers of the at least one linear actuator urged by fluid on both sides are connected in this sense directly to the pressurized-fluid supply or are urged thereby, and for positioning purposes, in other words to vary the position of the slide of the linear actuator in question, one of the two working chambers is selectively vented, the slide of the linear actuator in question is clamped with maximum stiffness in every operating situation, thus permitting particularly good regulation capability. Furthermore, it may be ensured with such a construction that ambient air is never aspirated into the linear actuator in question, whereby the penetration of contaminants into the system is ruled out and the useful life is prolonged. A further advantage of this improvement consists in the inexpensive structure, which can also be mastered very simply, by the fact that the at least one double-acting linear actuator, particularly preferably both double-acting linear actuators, may be regulated with a single electrofluidic signal transducer. Once again, all of the said advantages are of particular practical relevance, especially for pneumatic inventive valve actuating drives. In the sense of high safety against failure of the system, merely one of the possibilities is that, as already mentioned hereinabove, of storing fluid energy in a pressure accumulator (especially externally mounted), in order that the valve can still be brought at least to a predetermined safety position in the event of failure of the pressurized-fluid supply. Alternatively, it is also possible if necessary to integrate a mechanical energy-storing spring in at least one of the two linear actuators (or if necessary, especially by flanging a spring module onto the linear actuator in question, in a subassembly comprising the linear actuator in question). Particularly preferably, such a mechanical energy-storing spring is preloaded by fluidic pressure and interlocked in the preloaded position, so that it does not constantly urge the slide of the linear actuator in question in the sense that work would have to be done continuously against the force of the mechanical energy-storing spring. In this case the mechanical energy-storing spring urges the slide of the associated linear actuator only after actuation of an interlock release, by means of which a blockade holding the energy-storing spring is cancelled. Such a mechanical energy-storing spring, which is held in blocking condition during normal operation and is released only in an emergency by cancelation of the blockade, combines the advantages of high reliability of the valve actuating drive with further viewpoints, such as economy, compactness and actuation dynamics.

BRIEF DESCRIPTION OF THE FIGURES

Further advantageous improvements of the present invention are specified in the dependent claims or will become apparent from the explanation hereinafter of preferred exemplary embodiments of the present invention.

Herein

DETAILED DESCRIPTION

Figure 1:
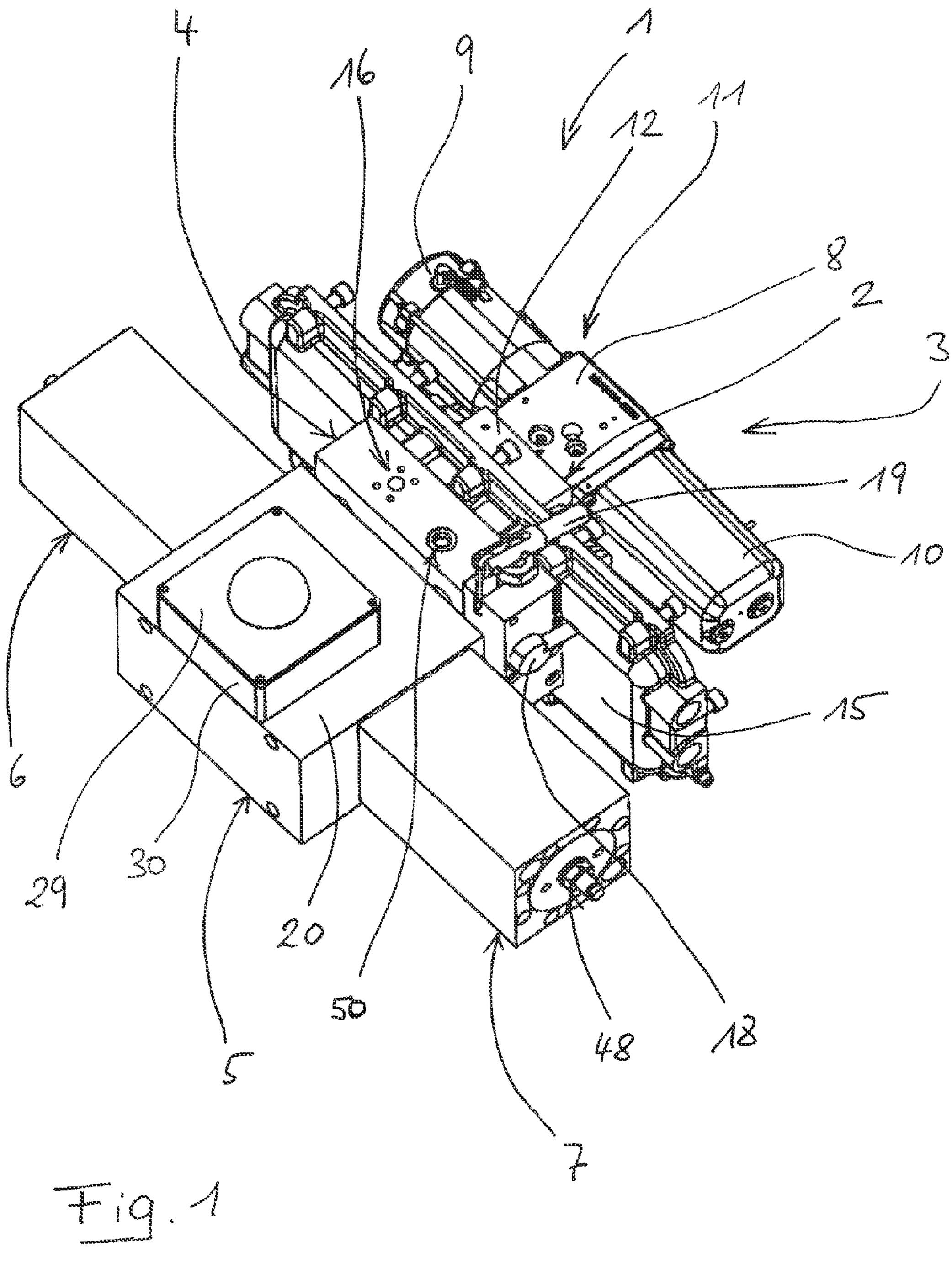
FIG. 1 shows a perspective view from above of a valve actuating drive according to the present invention.
Figure 2:
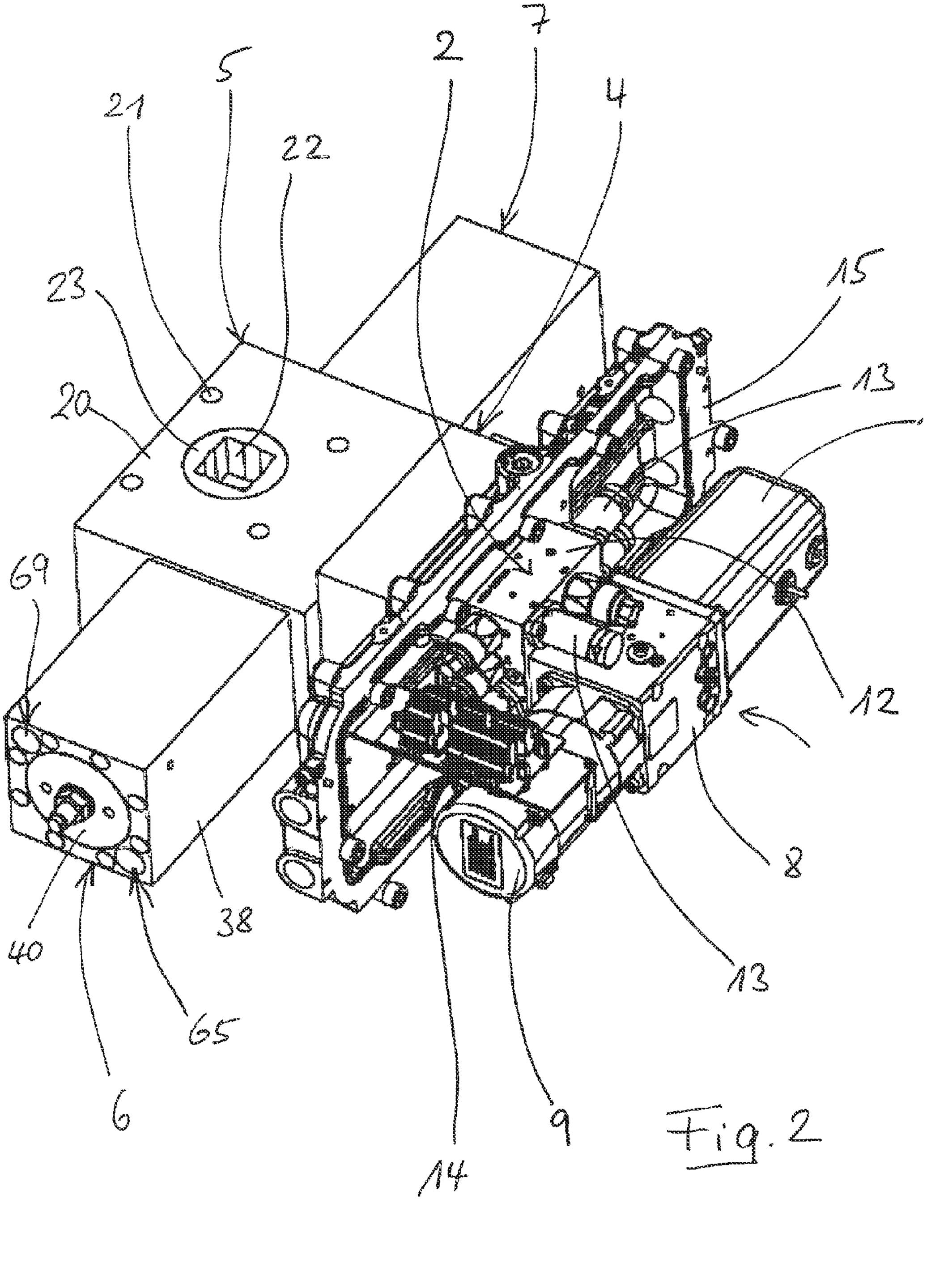
FIG. 2 shows a perspective view from below of the valve actuating drive according to FIG. 1.
Figure 3:
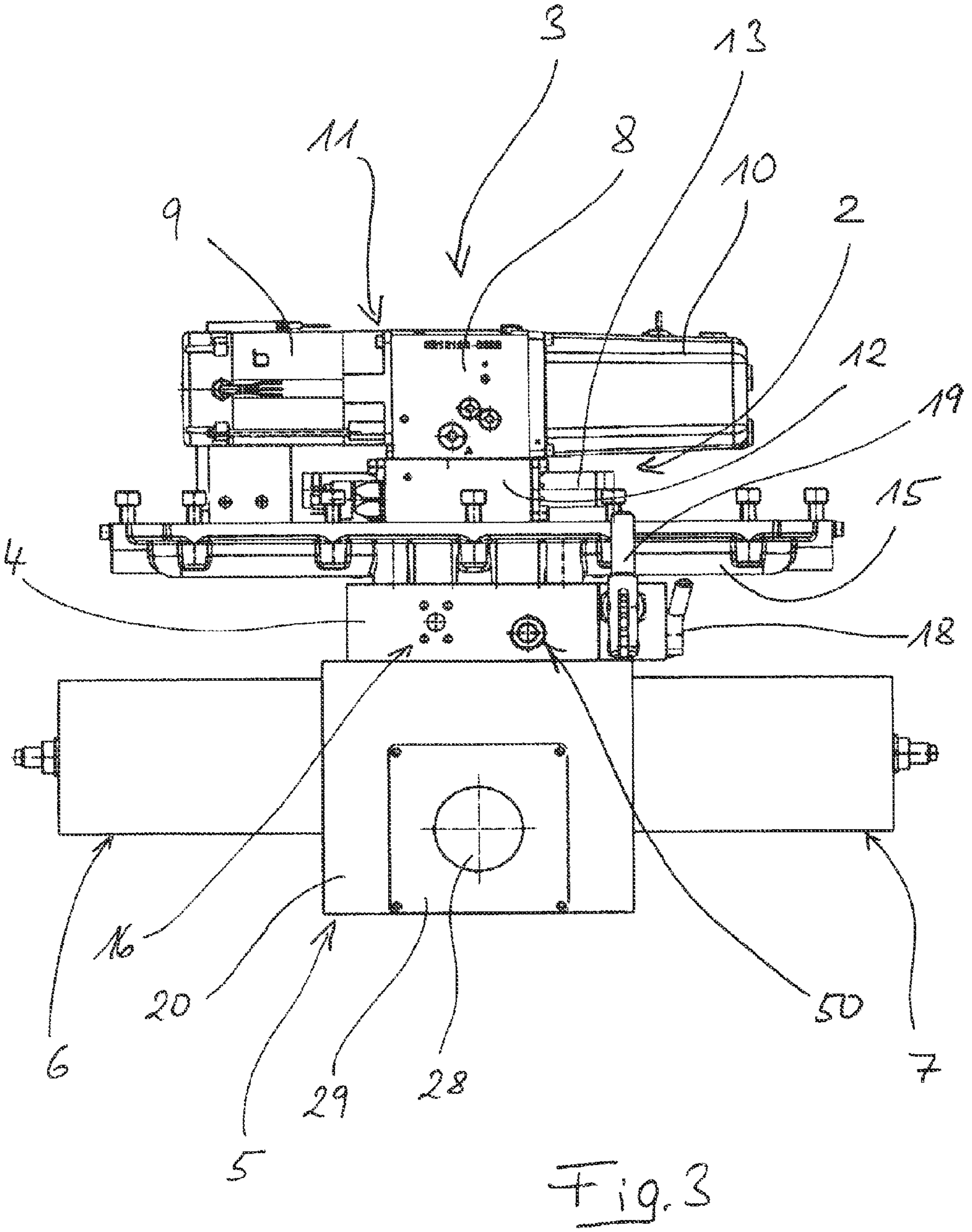
FIG. 3 shows the valve actuating drive according to FIGS. 1 and 2 in a perpendicular view from above.

Fluid-operated, namely hydraulic actuating drive 1, illustrated in FIGS. 1 to 3 of the drawing, used for operation of a valve, especially a shutoff, safety or regulation valve, comprises as the main component a base unit 2 with an integrated pressurized-fluid supply unit 3, an emergency-actuation block 4, a mechanical converter 5 flanged onto this as well as a first linear actuator 6 and a second linear actuator 7. This pressurized-fluid supply unit 3 is constructed as a hydraulic assembly 11 comprising a pump block 8, an electric motor 9 and a tank 10. Base unit 2 comprises, disposed inside base block 12 directly joined to pump block 8, the necessary control valves of the hydraulic control system; to this extent actuating magnets 13 of corresponding solenoid valves are shown projecting out of base block 12 of base unit 2. For explosion-protected construction of the valve actuating drive, there is provided a pressure-proof capsule, which encloses base unit 2 together with integrated pressurized-fluid supply unit 3 as well as electrical and electronic components 14, of which (only) capsule bottom part 15 is shown in the drawing, whereas the associated capsule hood is not illustrated. Capsule bottom part 15 is clamped between base unit 2 and emergency actuation block 4. It has the explosion-protected penetrations, constructed in known form, for the electrical supply, signal and control lines. Furthermore, flame barriers are disposed in the hydraulic lines connecting base block 12 with emergency actuation block 4.

Figure 4:
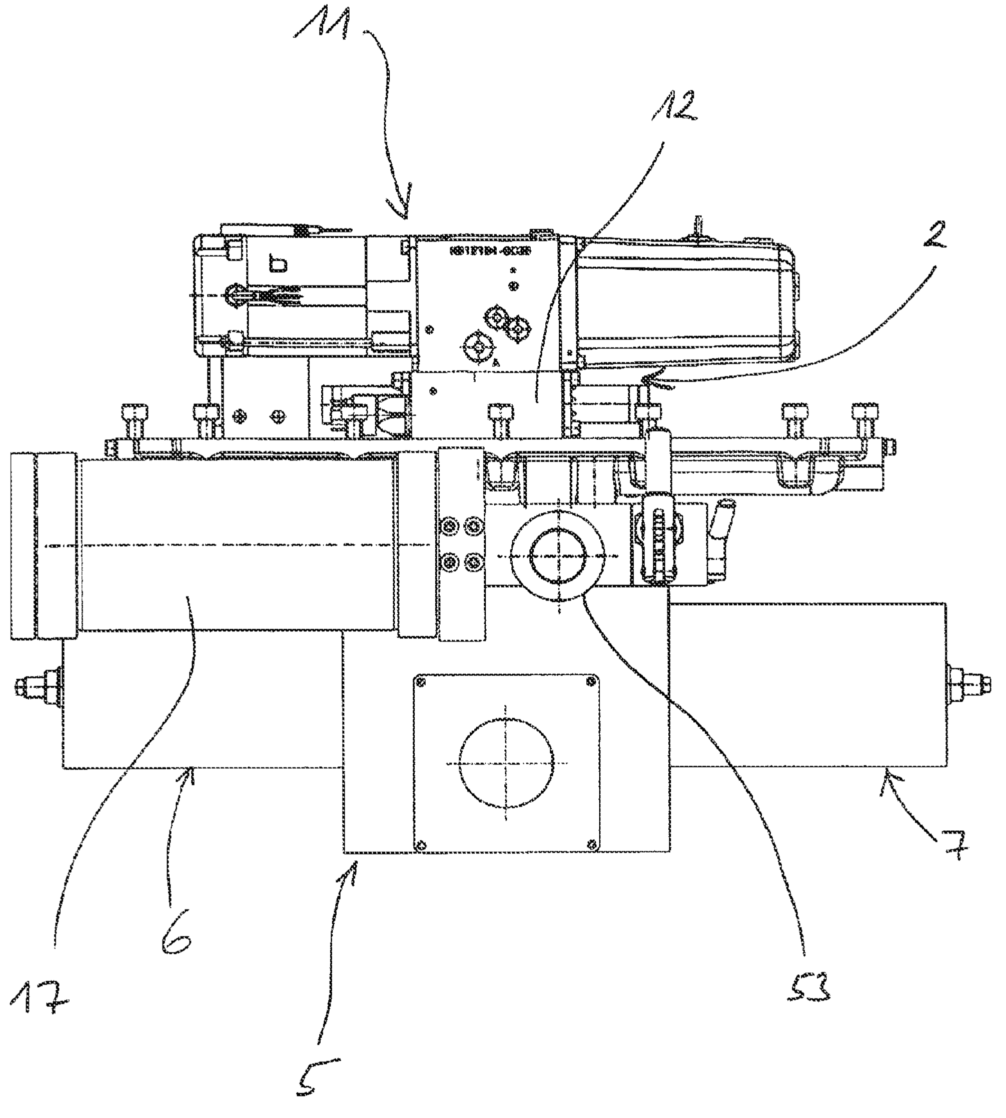
FIG. 4 shows the valve actuating drive according to FIGS. 1 to 3 in the view according to FIG. 3 with additionally mounted built-on parts.
Figure 5:
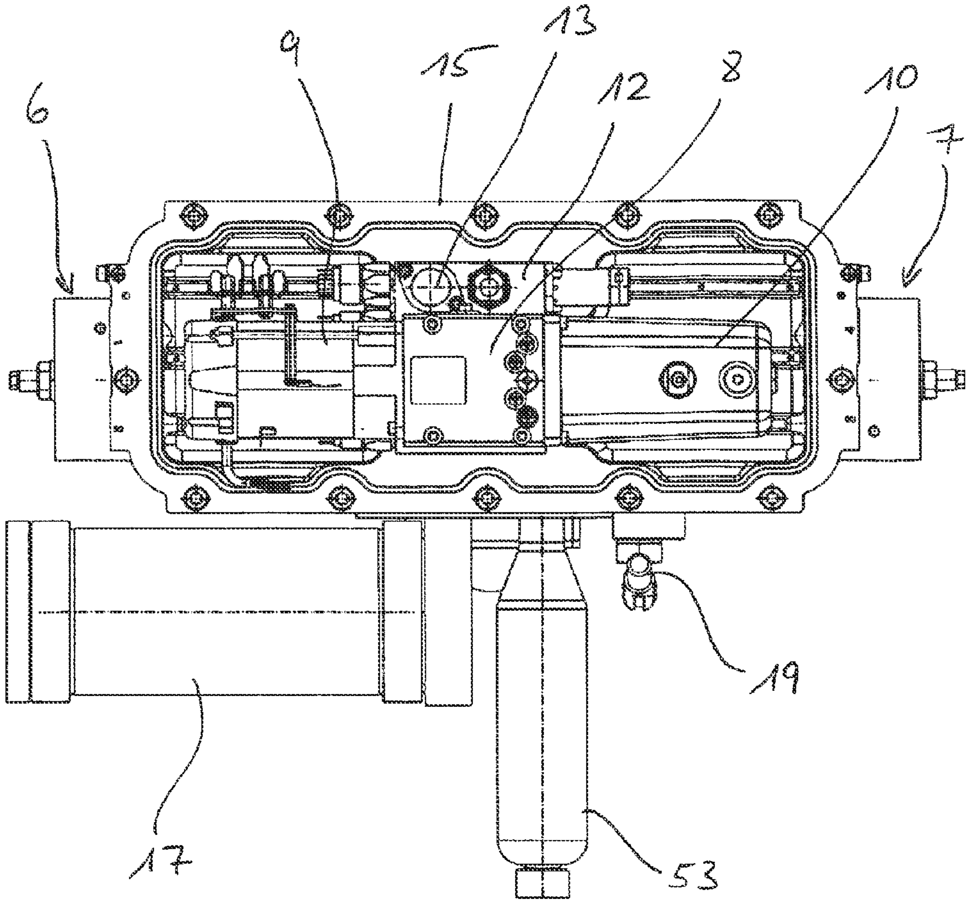
FIG. 5 shows a side view of the valve actuating drive according to FIG. 4.
Figure 6:
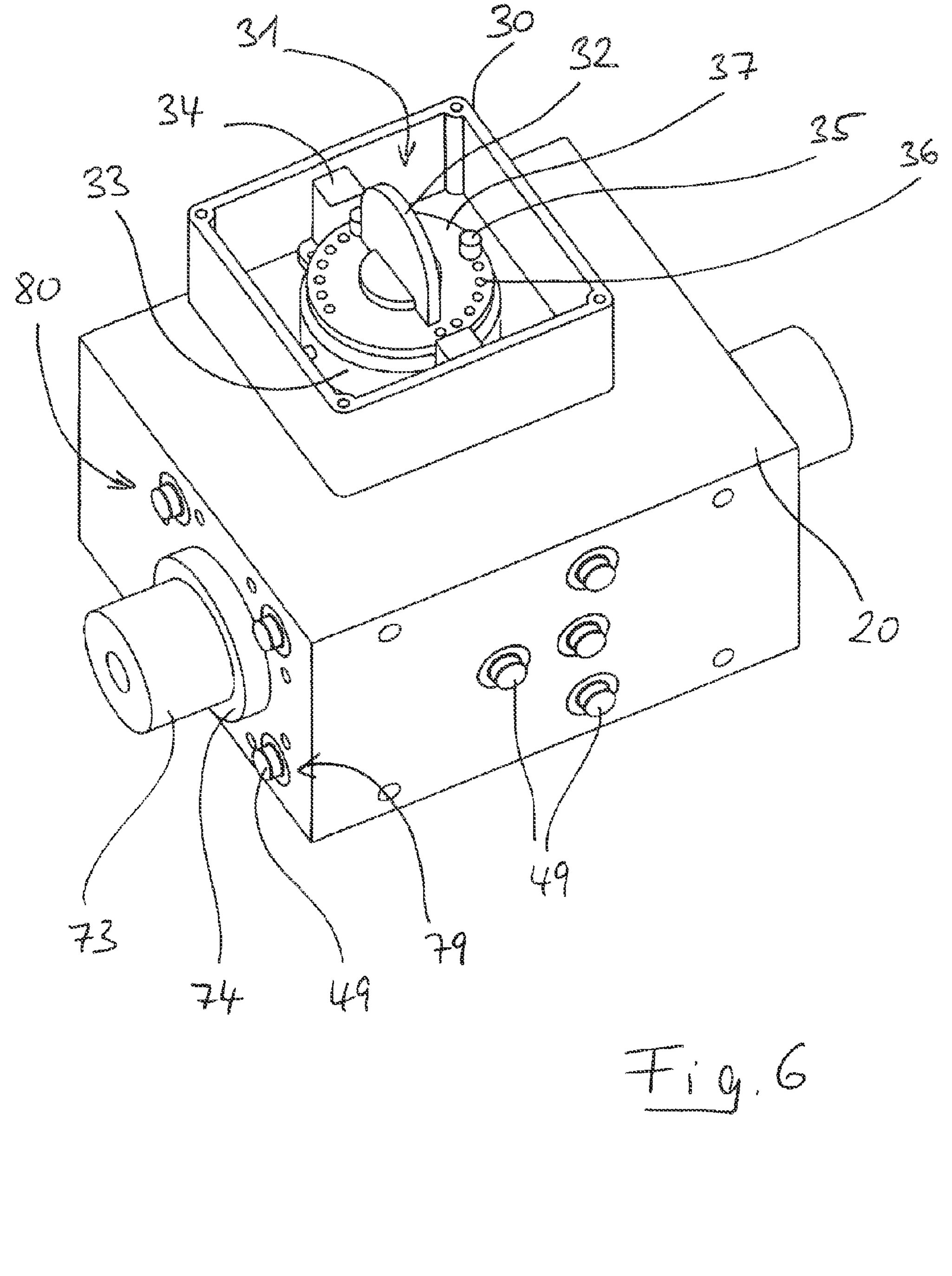
FIG. 6 shows a perspective view from above of the mechanical converter of the valve actuating drive according to FIGS. 1 to 5.
Figure 7:
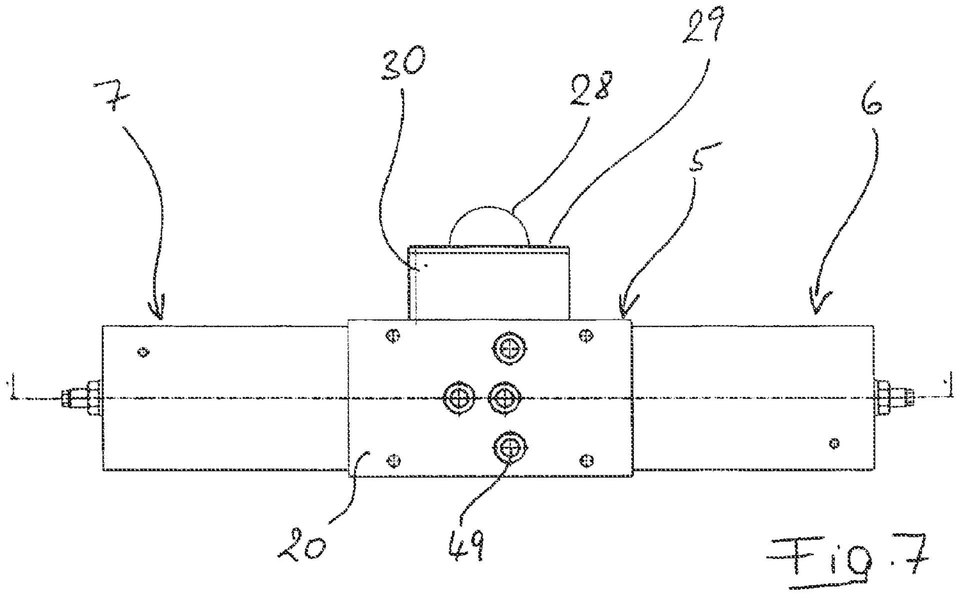
FIG. 7 shows a side view of the mechanical converter according to FIG. 6.
Figure 8:
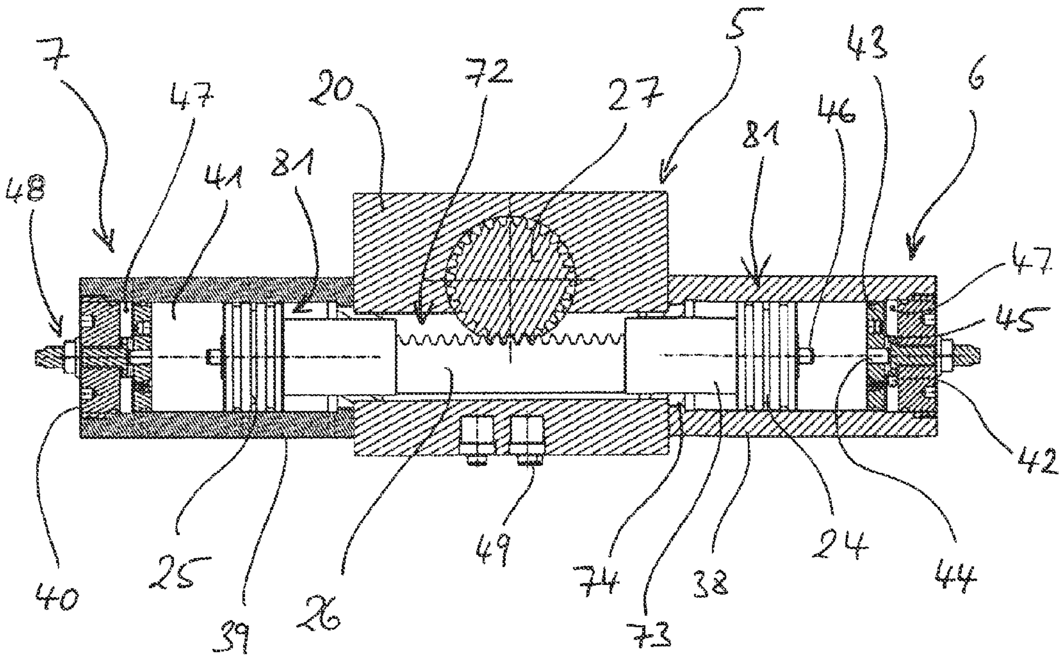
FIG. 8 shows a horizontal longitudinal section through the mechanical converter with flanged-on linear actuators according to FIG. 7.

A port 16 for an external hydraulic accumulator 17 (see FIGS. 4 and 5), which is intended and designed for emergency actuation of the valve actuating drive in the event of failure of the regular control system, is provided on emergency actuation block 4. The further components used for emergency actuation of the valve actuating drive, such as emergency valves in particular, are mounted inside emergency actuation block 4. Two devices, namely on the one hand a switch 18 and on the other hand a lever 19, are used for actuating the emergency valves. By means of switch 18, electrical actuation of the emergency valves is possible, for example in the event of a failure of the regular control system. If the power supply is interrupted and thus actuation of the emergency valves by means of switch 18 is not possible, purely mechanical actuation of the emergency valves by means of lever 19 always remains available.

Mechanical converter 5 comprises a housing constructed as converter block 20, which can be flanged directly onto the valve to be actuated, for which purpose converter block 20 is provided on its underside with threaded bores 21 for fastening screws. Furthermore, mechanical take-off means 23 of the valve actuating drive, which acts on the shaft of the valve, is located on the underside of the converter block. In the present exemplary embodiment, this comprises a square socket 22. Alternative embodiments of the take-off means for transmitting the necessary torque reliably to the input of the valve are known and in use in practice, for example a shaft connection by means of feather key. Inside mechanical converter 5, the linear motion of slides 81 of the two linear actuators 6 and 7, disposed opposite one another and flanged onto mechanical converter 5, are converted into a rotary motion of take-off means 23. This is achieved by the fact that a toothed rack 26, which can be displaced linearly parallel to pistons 24 and 25 belonging to linear actuators 6 and 7 and forming slides 81, meshes with a pinion 27, which is joined to rotate with mechanical take-off means 23. This toothed rack 26 is part of a slide 72, which further is provided with two cylindrical thrust and guide pieces 73, which are joined rigidly at a respective end to the toothed rack, are guided in a respective associated guide bush 74 and act at the end faces on pistons 24 and 25 bearing on them and belonging respectively to linear actuators 6 and 7.

An inspection box 30 covered by a viewing window 29 provided with a viewing dome 28 is mounted on converter block 20 on its upper side. Inside the inspection box, an optical position indicator 31, connected to turn with take-off means 23, is disposed with a position pointer 32, which projects into viewing dome 28 and thus can be read from all sides. Further disposed underneath the optical position indicator is an angle transmitter 33, whose signal is fed back to the electronic control system, as well as two sensors 34 for end-position sampling, likewise connected to the control system, wherein the two end positions may be defined by pins 35, which can be inserted in a template 36 of a disk 37 joined to turn with take-off means 23.

Linear actuator 6 comprises a cylinder 38, in which piston 24 is guided sealingly; analogously, linear actuator 7 comprises a cylinder 39, in which piston 25 is guided sealingly. Both cylinders 38 and 39 are closed at their end faces by a respective cover 40, which together with the respective associated cylinder and the respective piston 24 or 25 guided therein defines a hydraulic working chamber 41, into which an associated hydraulic line 42 discharges. Each of the two linear actuators is equipped with hydraulic end-position damping. For this purpose, a respective disk 43 with a central bore 44 and overflow ducts 45 is located inside respective working chamber 41 close to associated cover 40. On the end face of the respective piston 24 or 25 there is disposed a stud 46 which, when the piston approaches disk 43, slides with slight clearance (annular gap) into bore 44, whereby further displacement of hydraulic fluid from working chamber 41 is forced in throttled manner via connecting space 47 into hydraulic line 42, thus damping the further motion of the piston in this way. Disks 43 represent supplementary stops for the pistons, for which purpose their respective exact position inside associated working chamber 41 can be set by means of adjusting screw 48 valve actuating drive 1 is constructed modularly from the individual components, joined together to a functional unit as explained in the foregoing, in the form of base unit 2 together with integrated pressurized-fluid supply unit 3, from emergency actuation block 4, from mechanical converter 5 and from the two linear actuators 6 and 7. For this purpose the said individual components are joined to one another via flange faces respectively associated with one another in pairs. In this situation all the fluid connections placing base unit 2 together with integrated pressurized-fluid supply unit 3, emergency actuation block 4 and linear actuators 6 and 7 in communication with one another are routed as hydraulic lines inside the components in question, wherein the hydraulic connection of the two linear actuators 6 and 7 to emergency actuation block 4 takes place via hydraulic lines routed through converter block 20. In this way it is obvious that no kind of exposed fluid lines exist. And there is obtained a valve actuating drive in the form of a compact, closed fluidic drive system provided with one electrical input and one mechanical take-off means acting on the input of the valve.

The said fluid connections placing the individual components hydraulically in communication with one another are equipped in the region of the separating planes through which they pass between the individual components with self-closing shutoffs 49. These open only upon complete mounting of the two respective components in question and conversely close automatically if the components in question are separated during dismantling of the valve actuating drive. Thus the illustrated mechanical converter is provided on the respective faces containing ports for linear actuators 6 and 7 with three transfer points for hydraulic fluid equipped with shutoffs 49, namely for working pressure, tank and accumulator respectively, wherein the accumulator port becomes functionally involved only when a subassembly (see hereinafter) comprising a linear actuator with a structurally associated hydraulic accumulator is used in the individual configuration of the valve actuating drive. And on the face containing ports for emergency actuation block 4, the illustrated mechanical converter 5 is provided with four transfer points for hydraulic fluid equipped with shutoffs 49, namely two for the working pressure of the two linear actuators and one each for tank and accumulator. Respective filter elements 82 in the form of filters received in a pot 83 are associated structurally with the shutoffs.

Figure 9:
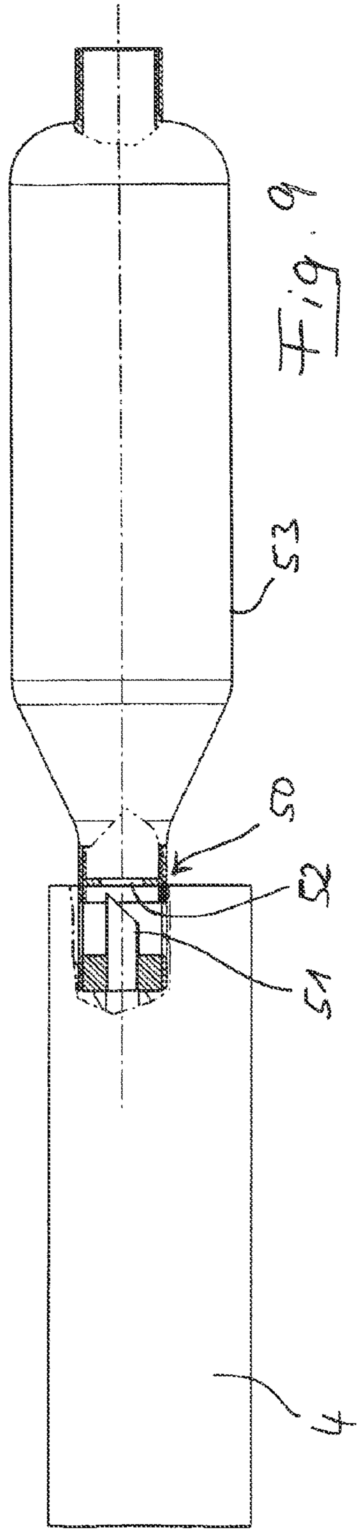
FIG. 9 shows the filling cartridge of the valve actuating drive according to FIGS. 4 and 5 in detail.

The valve actuating drive is prepared for first filling of the fluid system with hydraulic fluid from (at least) one cartridge. For this purpose, a filling port 50 is provided on emergency actuation block 4. Part of this filling port is (see FIG. 9) a piercing mandrel 51 constructed as a hollow needle, which opens closure seal 52 of a cartridge 53 screwed into filling port 50. Cartridge 53 or the last cartridge needed for complete filling of the fluid system remains on filling port 50, which it seals and at the same time provides a compensating volume.

Figure 10:
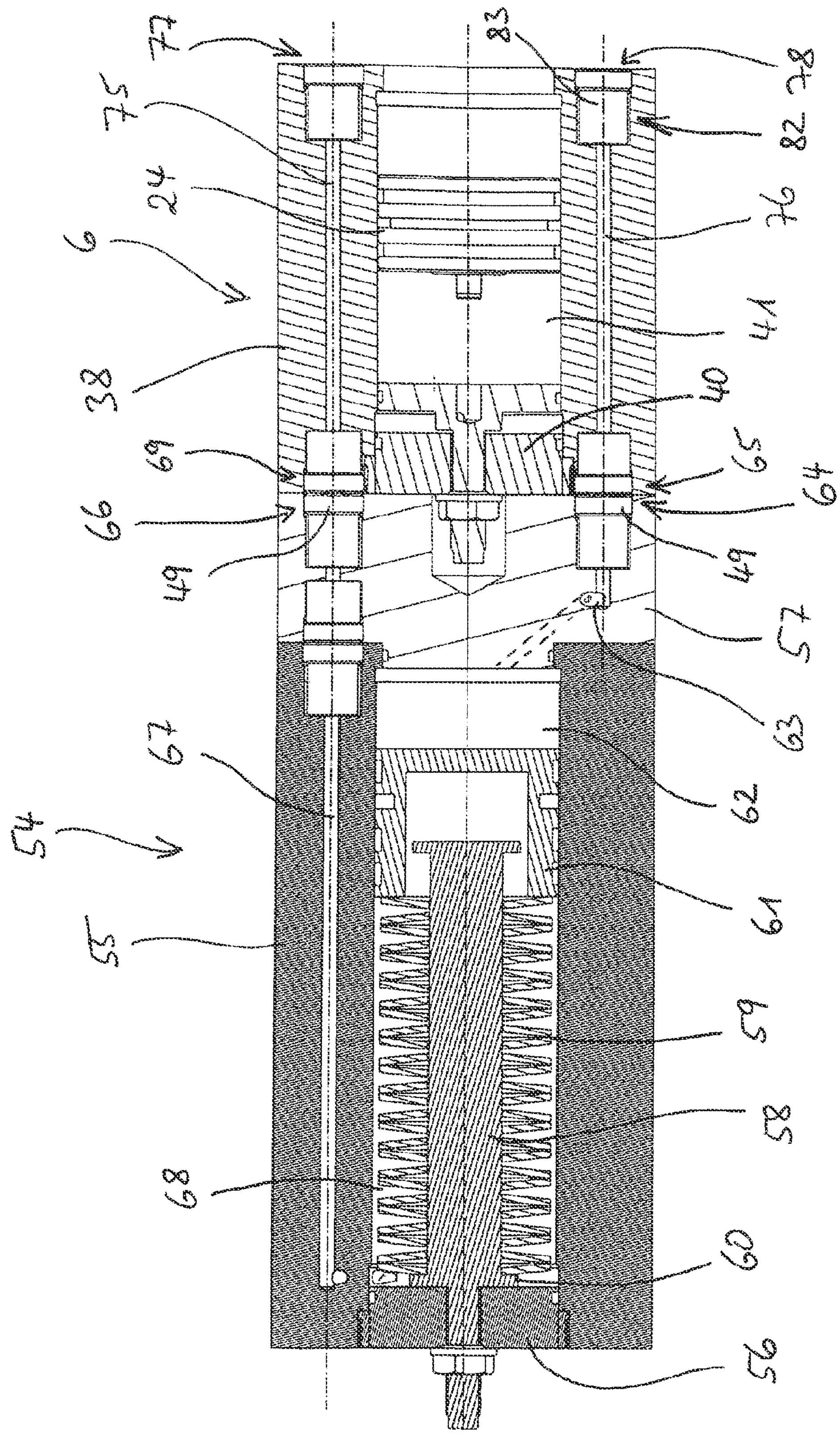
FIG. 10 shows a longitudinal section through a subassembly comprising a linear actuator and a flanged-on hydraulic accumulator, optionally usable in a valve actuating drive according to FIGS. 1 to 5 as an alternative to the linear actuators shown therein.

Instead of external hydraulic accumulator 17 described hereinabove, or possibly as a supplement thereto, at least one hydraulic accumulator integrated structurally in one of the two linear actuators 6 and 7 may be provided. An analogous possibility applies for the combination of linear actuator and hydraulic accumulator as one structural unit, in other words a subassembly. Such a possibility is illustrated in FIG. 10, which shows a diagonal longitudinal section through the corresponding subassembly. Accordingly, a hydraulic accumulator module 54 is flanged onto the end face of linear actuator 6. This comprises a cylindrical portion 55, a cover 56 closing it at the end face and a mounting and coupling plate 57 closing cylindrical portion 55 at the other end. On cover 56 there is mounted a guide mandrel 58, on which a stack of Belleville springs 59 is guided, which in turn is braced on shoulder 60 of guide mandrel 58 and at the other end acts on piston 61 guided displaceably in cylindrical portion 55. In this way, piston 61, cylindrical portion 55 and mounting and coupling plate 57 define an accumulator chamber 62, which is in communication with transfer point 64 on the accumulator side via a hydraulic line 63 routed in mounting and coupling plate 57. This transfer point, just as the corresponding transfer point 65 on the actuator side, is again equipped with a self-closing shutoff 49. The situation is analogous for transfer point 66 for tank line 67, which discharges into spring chamber 68, in which case transfer point 66 on the accumulator side cooperates with the corresponding transfer point 69 on the actuator side. Further visible in FIG. 10 is tank hydraulic line 75, which passes through cylinder 38 of linear actuator 6, as well as accumulator hydraulic line 76, which likewise passes through cylinder 38 of linear actuator 6, which lines end at associated transfer points 77 and 78 respectively, which cooperate with corresponding transfer points 79 and 80 of mechanical converter 5.

During emergency actuation of the valve actuating drive, the hydraulic fluid confined in accumulator chamber 62 is switched to one of the two linear actuators 6 or 7 via corresponding actuation of the valves of emergency actuation block 4, specifically depending on whether the valve is to be opened or else closed for the safety position. Otherwise the situation is analogous for the use of external hydraulic accumulator 17 described hereinabove. By the fact that neither a mechanical energy-storing spring constantly urges slide 72 of mechanical converter 5 nor accumulator chamber 62 constantly urges a hydraulic working chamber 41 of one of linear actuators 6 or 7 respectively, but does so only after actuation—achieved here by the valves of emergency actuation block 4—of an interlock release, by means of which a blockade—in this case hydraulic—holding energy-storing springs 59 is cancelled, the entire power of the linear actuators is available in normal operation for positioning the valve. Accordingly, the linear actuators may be of relatively small construction, thus enabling particularly compact embodiments of the valve actuating drive. By equipping the valve actuating drive with one hydraulic accumulator module 54 on one of the two linear actuators, with two hydraulic accumulator modules 54 on both linear actuators and/or with one external hydraulic accumulator as desired and to satisfy needs, it is obviously possible to adapt the valve actuating drive flexibly to the respective requirements and also to the respective space limitations.

Figure 11:
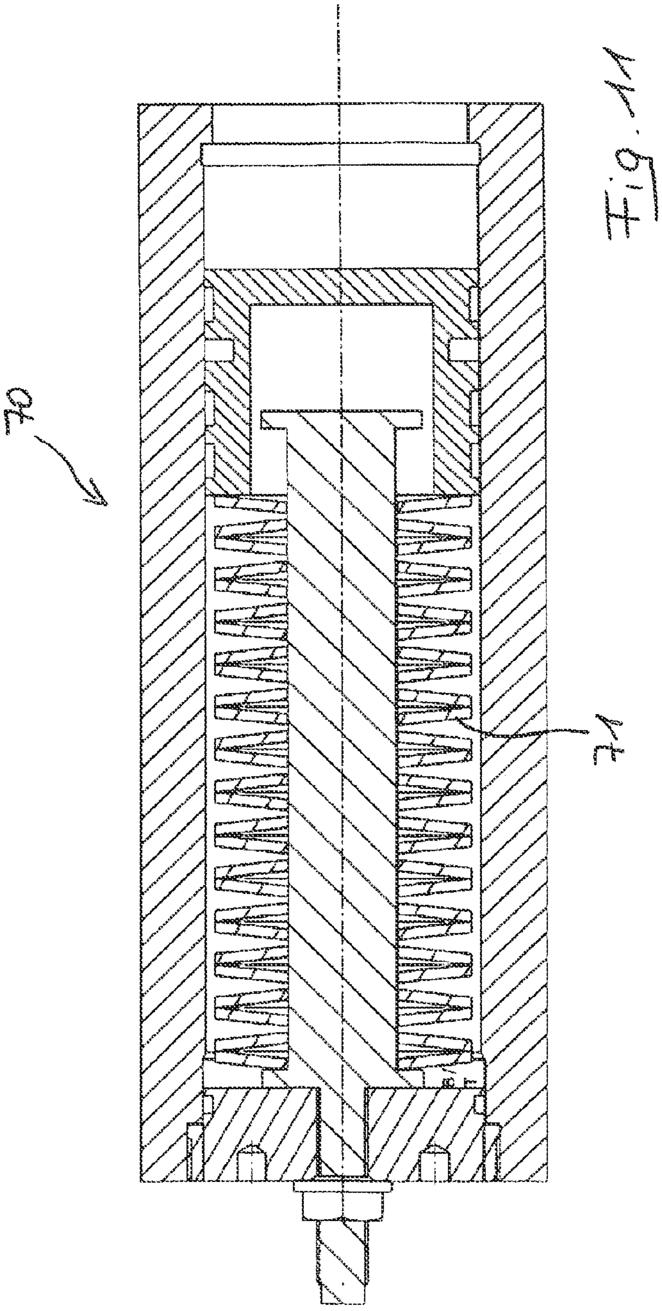
FIG. 11 shows a longitudinal section through a linear actuator in the form of a spring actuator, optionally usable as an alternative in the valve actuating drive according to FIGS. 1 to 5.

Otherwise one of the linear actuators may be constructed as a pure spring actuator 70 which, as illustrated in FIG. 11, comprises an integrated mechanical energy-storing spring 71 and otherwise is constructed substantially as the hydraulic accumulator module explained hereinabove.

Obviously the two linear actuators on mechanical converter 5 may be combined functionally as desired and the converter may accommodate, at each of its two port positions, a fluidic actuator, a mechanically coupled spring actuator, a mechanically decoupled spring actuator with fluidic actuation or a mechanically decoupled spring actuator with fluidic actuation as well as an additionally mechanically coupled fluidic actuator independent thereof, in which case the fluidic control is handled in all cases by the base unit.

We claim:

1. A fluid-operated valve actuating drive, especially a shutoff, safety or regulating valve actuating drive, comprising:

a base unit provided with control valves, two linear actuators disposed opposite one another and capable of being fluidically actuated via the control valves, a mechanical converter, which is disposed between the two linear actuators, which couples the actuators slides with one another and an output of which is configured for coupling with a target valve external to the valve actuating drive, and an electrically driven pressurized-fluid supply unit integrated in the base unit, wherein the valve actuating drive uses hydraulic fluid as the working fluid, is provided with a port for an external hydraulic accumulator and is constructed as a closed fluidic drive system provided with one electrical input and one mechanical take-off means acting on the input of the target valve, wherein the valve actuating drive is constructed modularly from individual components in the form of the base unit, joined together as a functional unit, of the two linear actuators and of the mechanical converter, and all fluid communications between the base unit and the linear actuators and if necessary the mechanical converter are routed inside the individual components, so that no kind of exposed fluid lines exist, and further comprising a self-aspirating filling device comprising a filling port, which is suitable for the first filling of the fluid system with hydraulic fluid from a cartridge; wherein at least one mechanical energy-storing spring is integrated in at least one of the two linear actuators or at least one subassembly comprising one of the two linear actuators; and the mechanical converter does not apply force in the direction of motion of the two linear actuators.

2. The drive according to claim 1, wherein the pressurized-fluid supply unit comprises a hydraulic assembly fed from a tank with a pump driven by an electric motor.

3. The drive according to claim 1, wherein the pressurized-fluid supply unit comprises a pneumatic pump driven by an electric motor and aspirating ambient medium.

4. The drive according to claim 3, wherein electric motor drives the aspirating ambient medium via a filter system.

5. The drive according to claim 1, wherein the fluid connections are equipped in the region of the separating planes through which the fluid connections pass between the components with self-closing shutoffs.

6. The drive according to claim 5, wherein respective filter elements are structurally associated with the self-closing shutoffs.

7. The drive according to claim 1, wherein the two linear actuators are flanged onto the mechanical converter, which in turn is connected via a flanged joint to the base unit or to an emergency actuation block disposed between the base unit and the converter.

8. The drive according to claim 1, further comprising preset or flexibly adjustable indicator means, end switches, end stops, end-position dampers, manual actuating means or position sensors.

9. The drive according to claim 1, wherein at least one of the linear actuators is constructed as a double-acting actuator urged by fluid on both sides, wherein both working chambers of the linear actuator in question are constantly connected to a pressure supply and urged with pressurized fluid.

10. The drive according to claim 1, wherein at least one mechanical energy-storing spring does not urge the slide of the linear actuator in question constantly but instead urges the linear actuator only after actuation of an interlock release, by means of which a blockade holding the energy-storing springs is cancelled.

11. The drive according to claim 1, wherein the mechanical energy-storing spring is clamped and blocked via a fluid, wherein the fluidic blockade is electrically tripped upon occurrence of specified disturbance events and the actuating drive assumes a specified safety position.

12. The drive according to claim 1, wherein there is used a fluidic pressure accumulator equipped with an energy-storing spring, which in the loaded condition contains, in the event of failure of a pressurized-fluid supply unit, at least the fluidic energy necessary to reach a safety position of the valve including the necessary safety reserves.

13. The drive according to claim 1, wherein the two linear actuators on the mechanical converter may be combined functionally as desired and the converter may accommodate, at each of the converters two port positions, a fluidic actuator, a mechanically coupled spring actuator, a mechanically decoupled spring actuator with fluidic actuation or a mechanically decoupled spring actuator with fluidic actuation as well as an additionally mechanically coupled fluidic actuator independent thereof.

14. The drive according to claim 1, wherein the self-aspirating filling device comprises a device disposed on the base unit or on an emergency actuation block and which besides the cartridge port does not need an additional external refilling port.

15. The fluid-operated valve actuating drive of claim 1 wherein the mechanical converter does not exert force for moving the two linear actuators.

16. The fluid-operated valve actuating drive of claim 1 wherein the two linear actuators act simultaneously to apply force to the mechanical converter.

* * * * *